(12) United States Patent
Zhang

(10) Patent No.: US 9,346,378 B2
(45) Date of Patent: May 24, 2016

(54) INFANT CARE DEVICE

(71) Applicant: BP Children's Products HK Co., Limited, Kwai Chung, N.T. (HK)

(72) Inventor: Da-Liang Zhang, Guangdong (CN)

(73) Assignee: BP CHILDREN'S PRODUCTS HK CO., LIMITED, Hong Kong (HK)

( * ) Notice: Subject to any disclaimer, the term of this patent is extended or adjusted under 35 U.S.C. 154(b) by 0 days.

(21) Appl. No.: 14/590,510

(22) Filed: Jan. 6, 2015

(65) Prior Publication Data

US 2015/0191108 A1      Jul. 9, 2015

(30) Foreign Application Priority Data

Jan. 7, 2014 (CN) .......................... 2014 1 0007016

(51) Int. Cl.
*B60N 2/28* (2006.01)
*B62B 7/12* (2006.01)
*B62B 7/14* (2006.01)

(52) U.S. Cl.
CPC ................ *B60N 2/2848* (2013.01); *B62B 7/12* (2013.01); *B62B 7/145* (2013.01)

(58) Field of Classification Search
CPC .. B60N 2/2821; B60N 2/2824; B60N 2/2848; B62B 7/14; B62B 7/142; B62B 7/145
USPC ............................................. 297/130, 256.16
See application file for complete search history.

(56) References Cited

U.S. PATENT DOCUMENTS

| | | | | | |
|---|---|---|---|---|---|
| 4,306,749 | A | * | 12/1981 | Deloustal | B60N 2/286 297/130 |
| 4,634,177 | A | * | 1/1987 | Meeker | B60N 2/2821 297/256.16 |
| 4,915,446 | A | * | 4/1990 | Darling | B60N 2/2875 297/256.13 |
| 5,947,556 | A | * | 9/1999 | Strojny | B60N 2/2824 297/130 |
| 6,286,844 | B1 | * | 9/2001 | Cone, II | B62B 9/28 280/47.41 |
| 6,595,583 | B2 | * | 7/2003 | Hou | B60N 2/2848 297/130 |
| 8,251,382 | B2 | * | 8/2012 | Chen | B62B 7/142 280/47.38 |
| 8,678,498 | B2 | * | 3/2014 | Heisey | B60N 2/2821 297/130 |
| 2012/0326474 | A1 | * | 12/2012 | Williams | B60N 2/2821 297/183.1 |

* cited by examiner

*Primary Examiner* — Peter Brown
(74) *Attorney, Agent, or Firm* — Hamre, Schumann, Mueller & Larson, P.C.

(57) ABSTRACT

An infant care device includes a casing, a latch member, a driving member and a first resilient member. The casing has an insertion space permitting an insertion portion of a mounting seat to be inserted thereinto. The latch member is mounted movably to the casing. The first resilient member biases the latch member to engage the insertion portion so as to prevent relative movement between the infant care device and the insertion portion. The driving member is mounted to the casing, and is able to be pushed to move a cam portion thereof to disengage the latch member from the insertion portion against the biasing action of the first resilient member, so as to permit the relative movement between the infant care device and the insertion portion.

7 Claims, 9 Drawing Sheets

INFANT CARE DEVICE

CROSS-REFERENCE TO RELATED APPLICATION

This application claims priority of Chinese Application No. 201410007016.5, filed on Jan. 7, 2014.

FIELD OF THE DISCLOSURE

The disclosure relates to an infant care device, more particularly to an infant seat that can be mounted detachably to a stroller.

BACKGROUND OF THE DISCLOSURE

A conventional separable infant stroller assembly includes a stroller and an infant seat mounted detachably to the stroller. The infant seat can be carried by the stroller, or be detached from the stroller and mounted to a car seat. However, such an infant stroller assembly may have a complex structure, or may be operated in a difficult way.

SUMMARY OF THE DISCLOSURE

Therefore, the object of the present disclosure is to provide an infant care device that can overcome the aforesaid drawback associated with the prior art.

Accordingly, an infant care device of the present disclosure is mounted detachably to a mounting seat. The mounting seat has an insertion portion. The infant care device includes a casing, a latch member, a driving member and a first resilient member. The casing has an insertion space that has an opening permitting the insertion portion to be inserted removably into the insertion space therethrough. The latch member is mounted to the casing, and is movable relative to the casing in a left-right direction of the infant care device between a locking position where the latch member engages the insertion portion to confine the insertion portion in the insertion space, and an unlocking position where the latch member is disengaged from the insertion portion such that the insertion portion is removable from the insertion space. The driving member is mounted movably to the casing and has a cam portion. The driving member is able to be pushed to move the cam portion from a release position to a pushing position in a front-rear direction of the infant care device for driving movement of the latch member relative to the casing. The first resilient member is connected between the casing and the latch member, and biases resiliently the latch member toward the locking position, so as to prevent relative movement between the infant care device and the mounting seat. When the driving member is pushed to move the cam portion to the pushing position, the latch member is pushed by the cam portion to move to the unlocking position against the biasing action of the first resilient member to disengage the latch member from the insertion portion, so as to permit the relative movement between the infant care device and the mounting seat.

BRIEF DESCRIPTION OF TUE DRAWINGS

Other features and advantages of the present disclosure will become apparent in the following detailed description of the embodiments with reference to the accompanying drawings, of which:

DETAILED DESCRIPTION OF THE EMBODIMENTS

Figure 1:
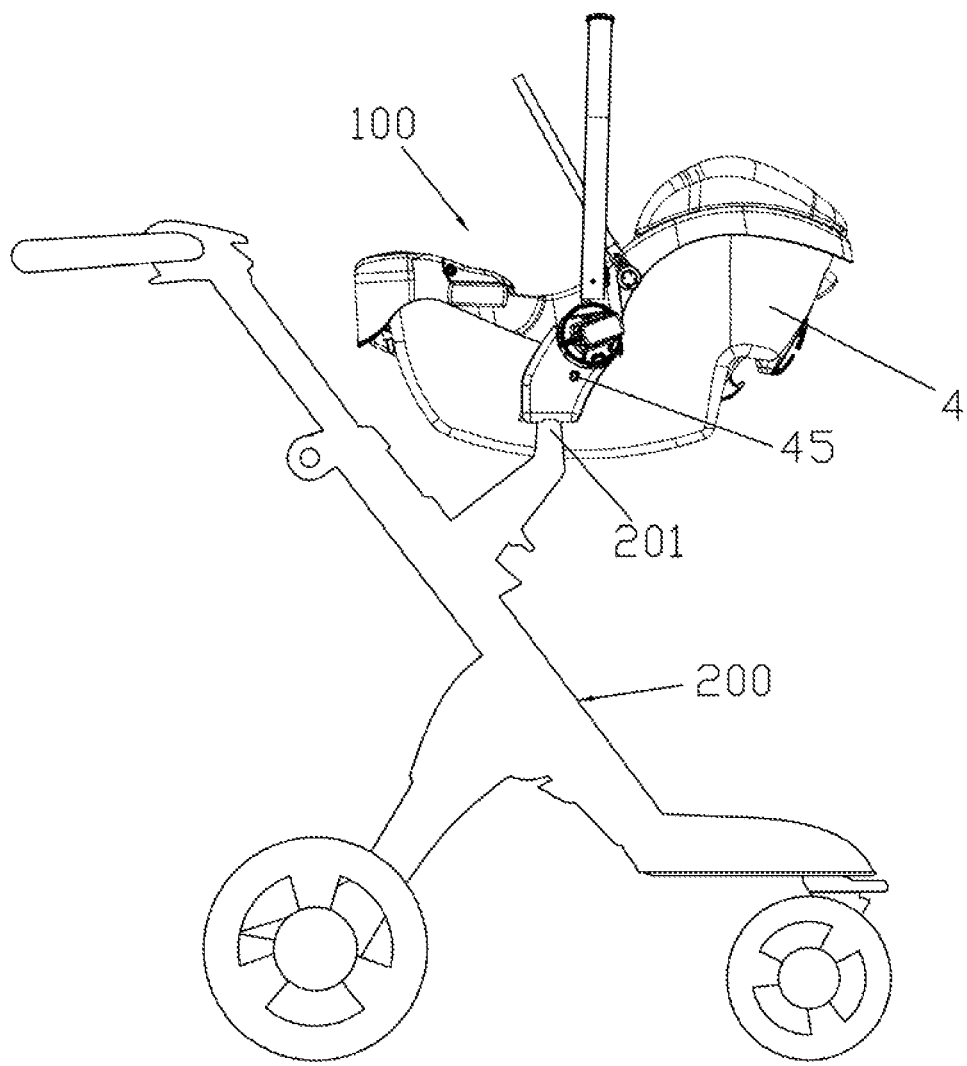
FIG. 1 is a schematic side view of a first embodiment of an infant care device according to the disclosure, illustrating the first embodiment mounted on a stroller.

Before the present disclosure is described in greater detail, it should be noted that like elements are denoted by the same reference numerals throughout the disclosure.

Figure 2:
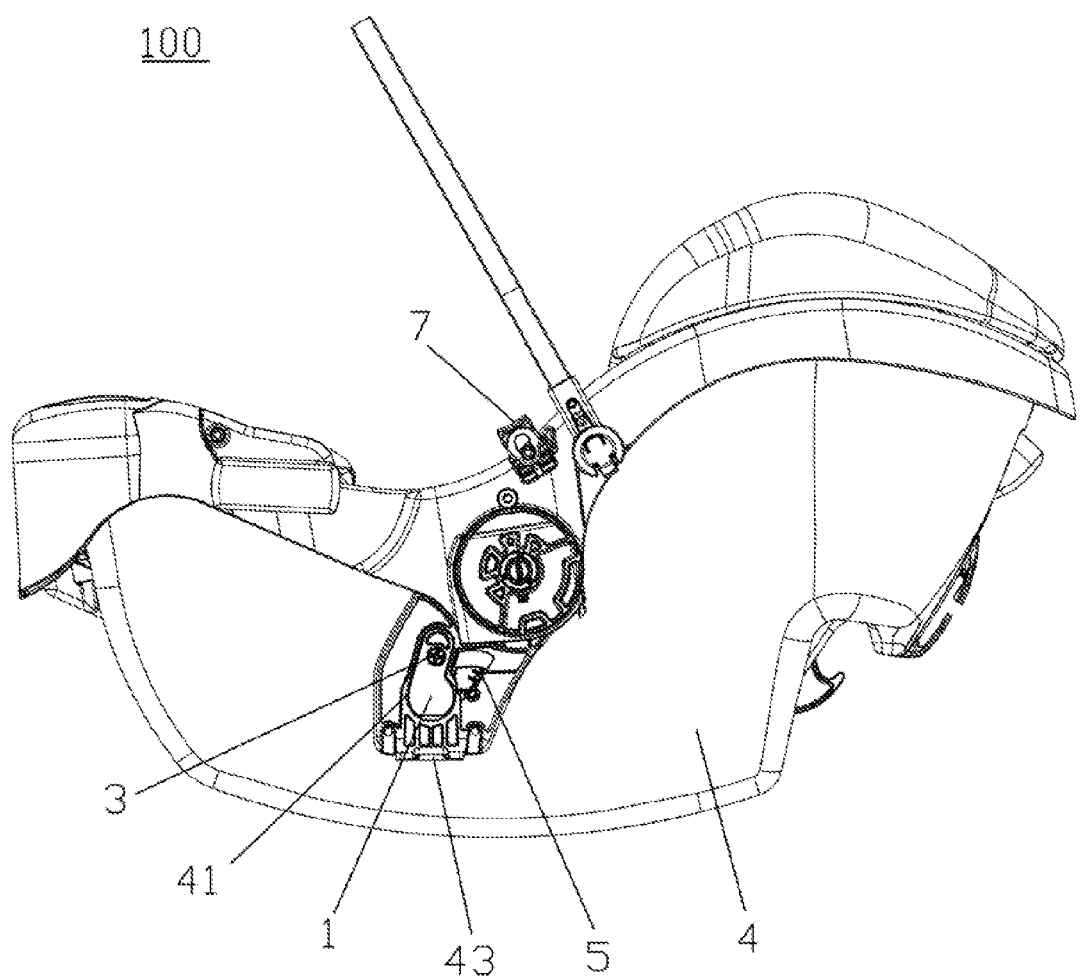
FIG. 2 is a side view of the first embodiment.
Figure 3:
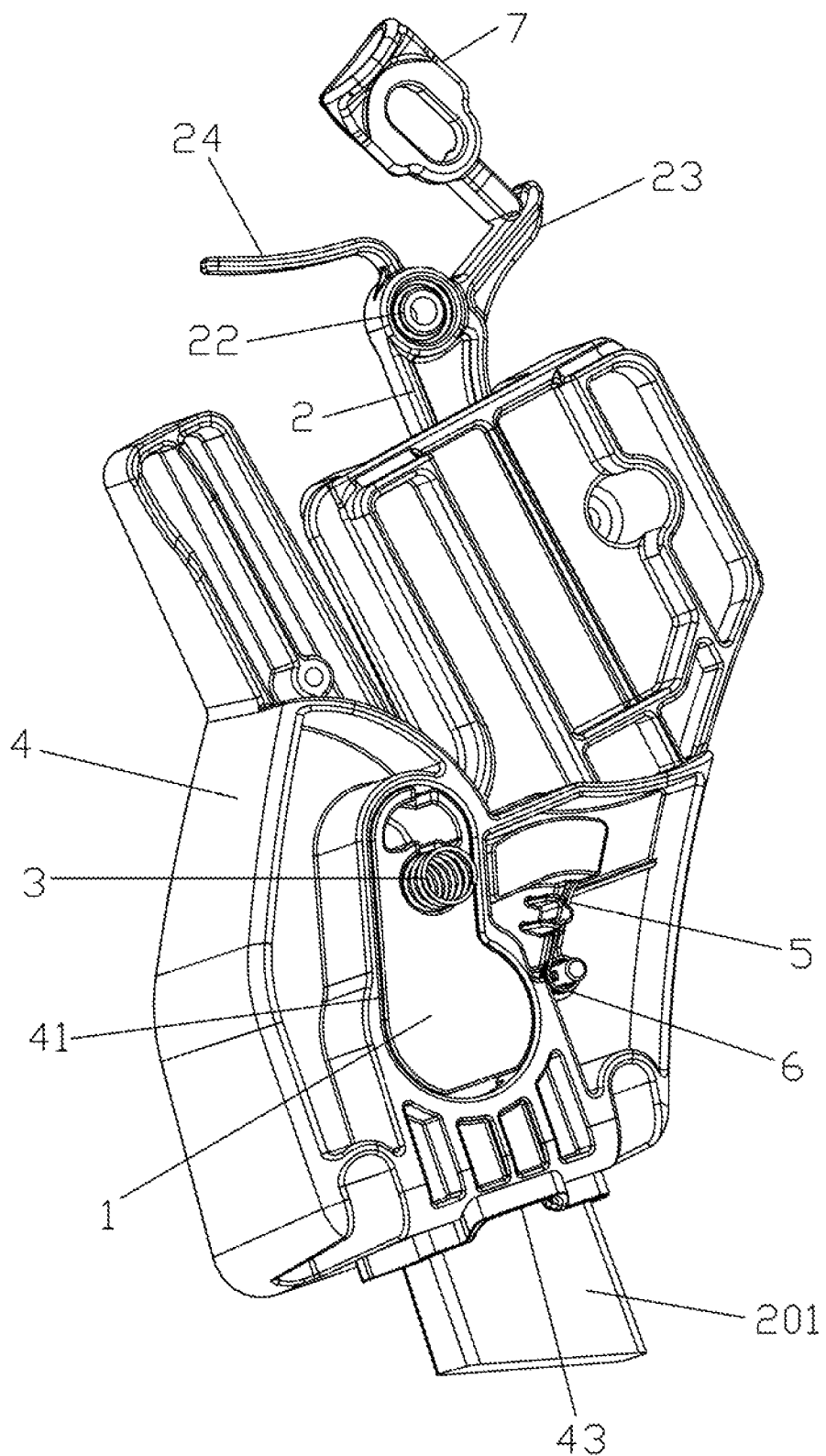
FIG. 3 is a fragmentary perspective view of the first embodiment.
Figure 4:
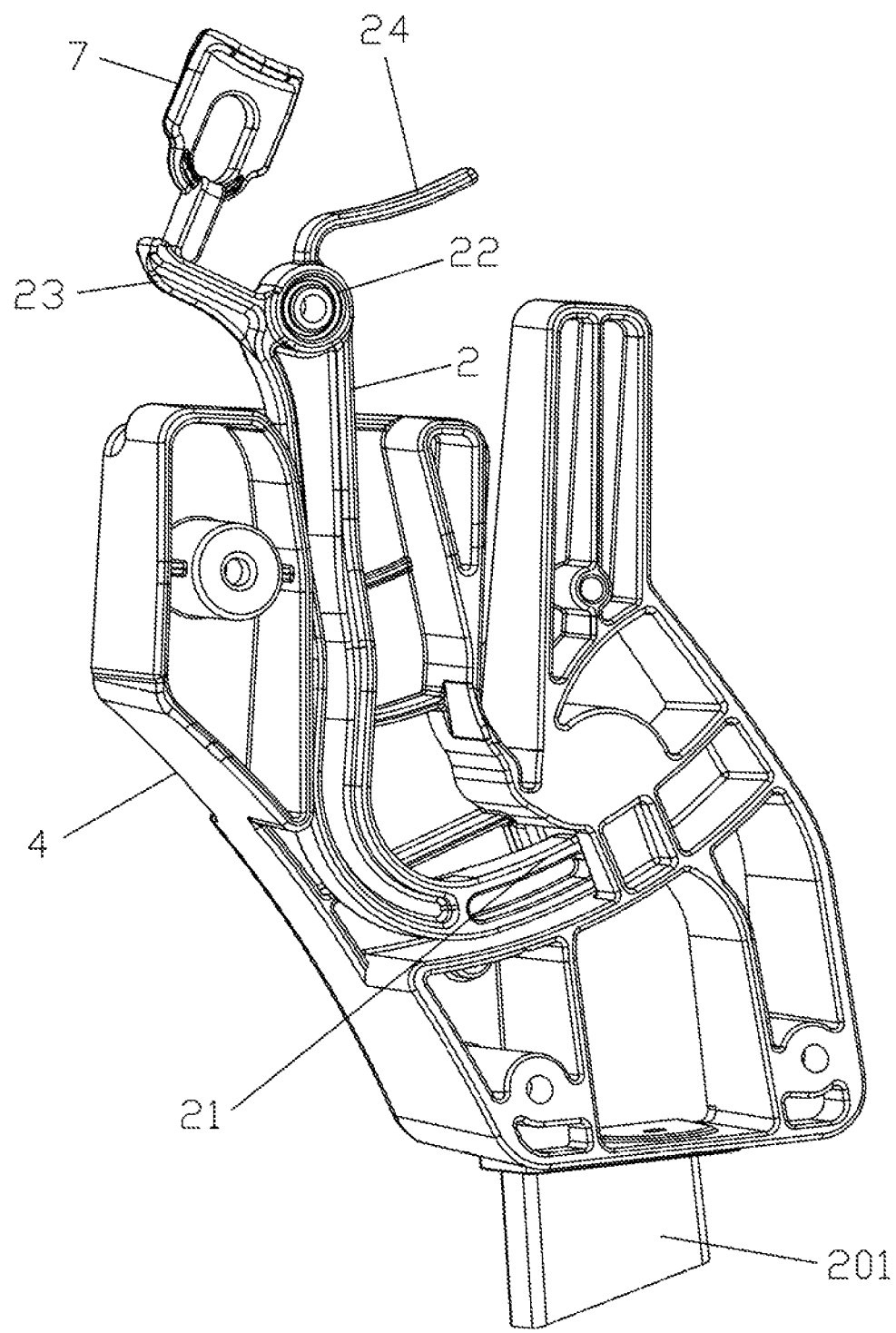
FIG. 4 is another fragmentary perspective view of the first embodiment.
Figure 5:
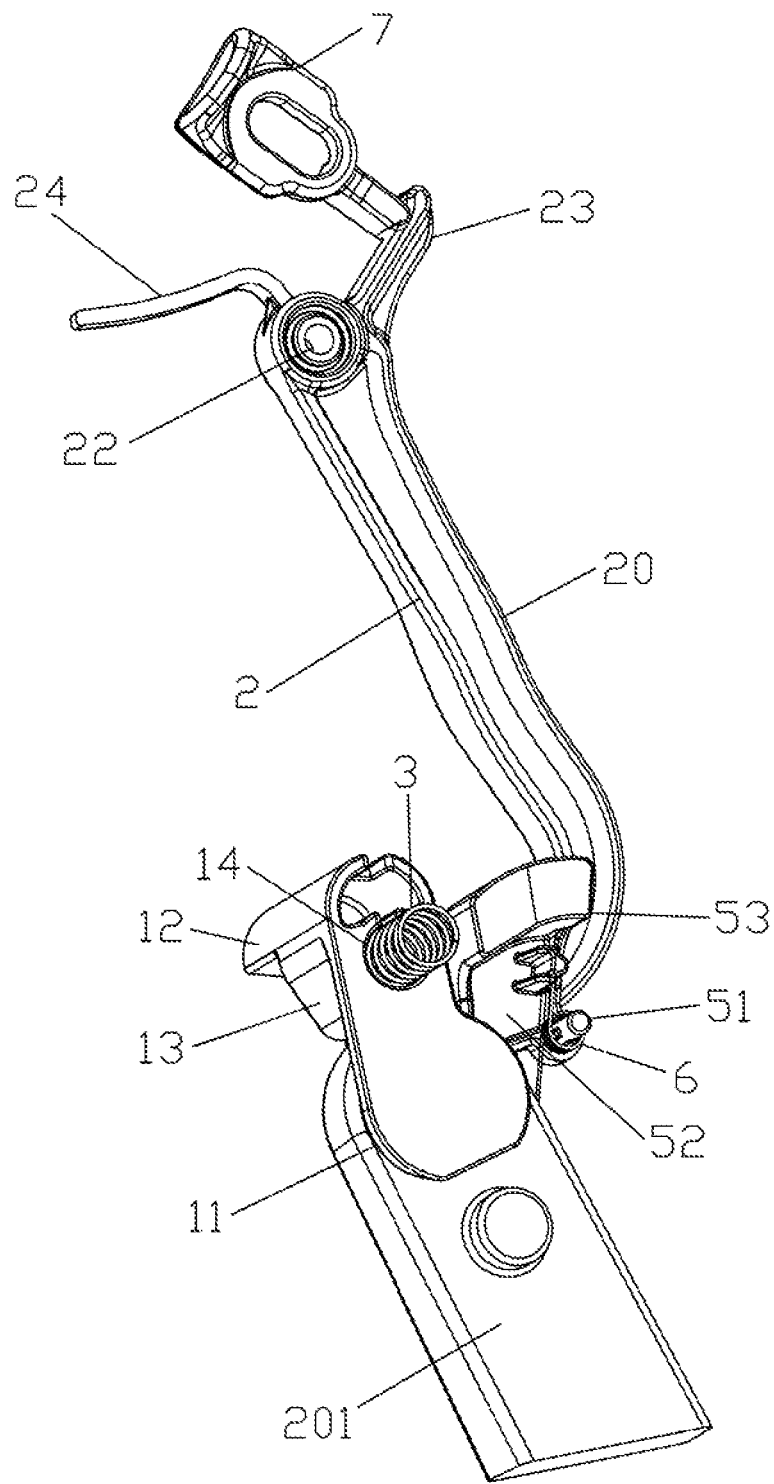
FIG. 5 is an assembled perspective view of the first embodiment in which a casing is omitted.

As shown in FIGS. 1 and 2, a first embodiment of an infant care device 100 according to the present disclosure is configured as an infant seat, and is mounted detachably to a mounting seat, such as a stroller 200. The stroller 200 has an insertion portion 201. The first embodiment includes a latch member 1, a driving member 2, a first resilient member 3 and a casing 4.

The casing 4 has an insertion space 41 that has a bottom opening 43. The insertion portion 201 of the stroller 200 is inserted removably into the insertion space 41 through the bottom opening 43.

Figure 7:
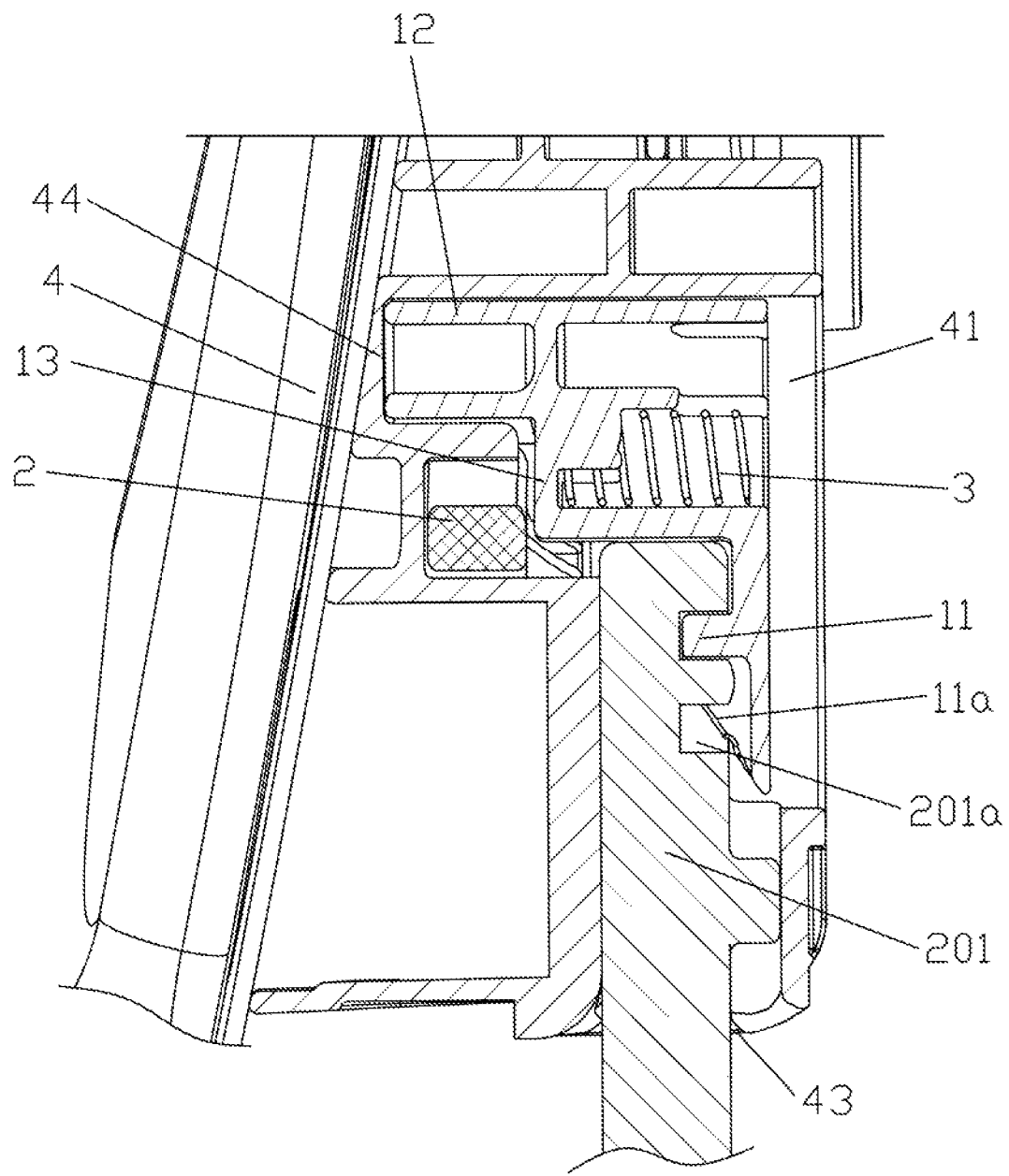
FIG. 7 is a fragmentary sectional view of the first embodiment illustrating a latch member at a locking position.
Figure 8:
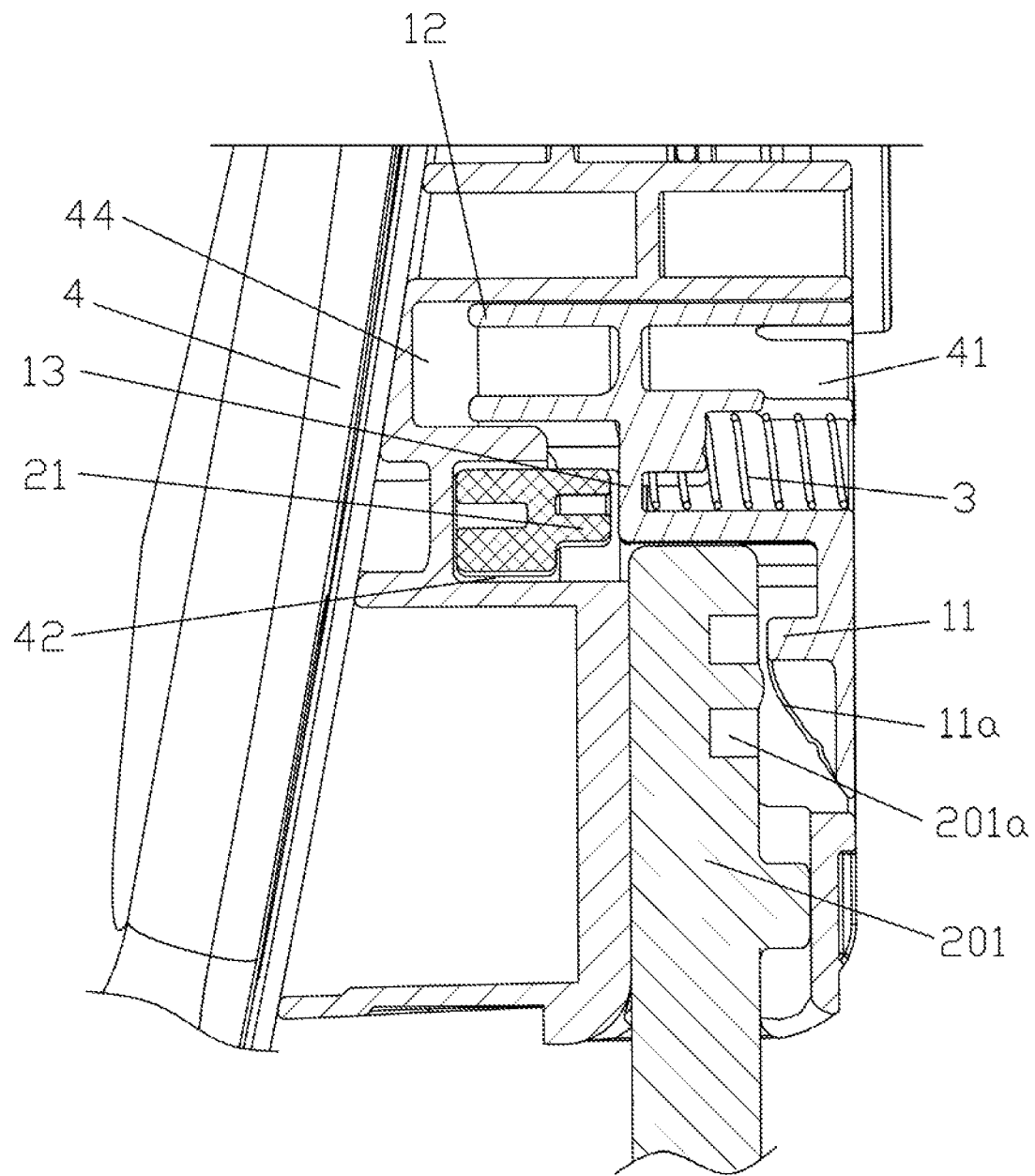
FIG. 8 is another fragmentary sectional view of the first embodiment illustrating the latch member at an unlocking position.

The latch member 1 is mounted to the casing 4, and is movable relative to the casing 4 in a left-right direction of the infant care device 100 between a locking position (see FIG. 7) where the latch member 1 engages the insertion portion 201 to confine the insertion portion 201 in the insertion space 41, and an unlocking position (see FIG. 8) where the latch member 1 is disengaged from the insertion portion 201 such that the insertion portion 201 is removable from the insertion space 41.

The driving member 2 is connected pivotally to the casing 4, and has a cam portion 21. The driving member 2 is able to be pushed to move the cam portion 21 from a release position (see FIG. 7) to a pushing position (see FIG. 8) in a front-rear direction of the infant care device 100 for driving movement of the latch member 1 relative to the casing 4.

The first resilient member 3 is connected between the casing 4 and the latch member 1 and biases resiliently the latch member 1 to the locking position, so that relative movement between the infant care device 100 and the stroller 200 is prevented. In this embodiment, the first resilient member 3 is configured as a compression spring, and has opposite ends that are respectively connected to an inner surface of the casing 4 and one side of the latch member 1 opposite to the cam portion 21 of the driving member 2 (see FIG. 7).

When the driving member 2 is pushed to move the cam portion 21 to the pushing position, the latch member 1 is pushed by the cam portion 21 to move to the unlocking position against the biasing action of the first resilient member 3 to disengage the latch member 1 from the insertion portion 201, so as to permit the relative movement between the infant care device 100 and the stroller 200.

Referring to FIGS. 3 to 7, the latch member 1 has an engaging portion 11, a mount portion 12 and an abutment portion 13. The insertion portion 201 of the stroller 200 is formed with an annular recess 201a (see FIG. 6). The engaging portion 11 is configured as an annular protrusion for engaging the annular recess 201a to prevent the relative movement between the infant care device 100 and the stroller 200. The thickness of the engaging portion 11 is reduced in a direction toward the bottom opening 43, such that the engaging portion has an inclined end surface 11a (see FIG. 7). During insertion of the insertion portion 201 into the insertion space 41, the insertion portion 201 pushes the end surface 11a of the engaging portion 11 to move the latch member 1 toward the unlocking position against the biasing action of the first resilient member 3. When the insertion portion 201 is completely inserted into the insertion space 41, the engaging portion 11 and the annular recess 201a are aligned with each other, and the first resilient member 3 biases the latch member 1 toward the locking position to engage the engaging portion 11 within the annular recess 201a. The mount portion 12 engages slidably a mount space 44 of the casing 4 such that the latch member 1 is prevented from rotating relative to the casing 4. The abutment portion 13 is in slidable contact with the cam portion 21 of the driving member 2. The latch member 1 further has an installation hole 14 that is formed in a side surface of the latch member 1 opposite to the cam portion 21. The first resilient member 3 is partially retained in the installation hole 14.

Figure 6:
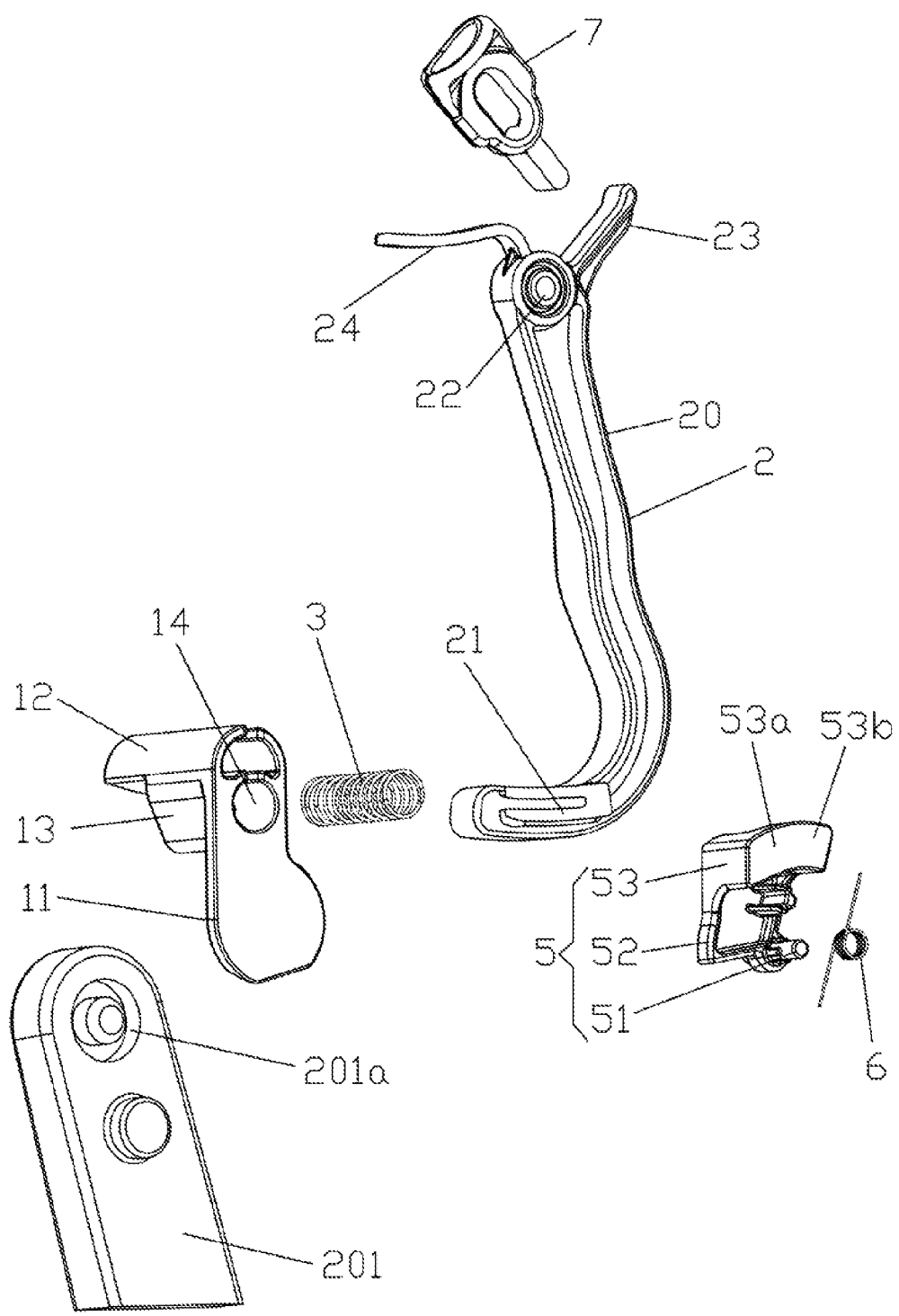
FIG. 6 is an exploded perspective view of the first embodiment in which the casing is omitted.

The driving member 2 has an L-shaped main body 20, a driven portion 23 and an elastic portion 24 (see FIG. 6). The main body 20 has a pivoted portion 22 and the cam portion 21 that are provided at opposite distal portions thereof. The pivoted portion 22 is connected pivotally to the casing 4. The cam portion 21 extends in the front-rear direction of the infant care device 100. The thickness of the cam portion 21 in the left-right direction of the infant care device 100 is reduced in a direction toward a distal end of the cam portion 21. The driven portion 23 extends from the pivoted portion 22 in a direction away from the cam portion 21. The infant care device 100 further includes an operating member 7 that is mounted movably to the casing 4, and that is partially disposed outwardly of the casing. The operating member 7 is coupled to the driven portion 23, and is operable to push the driven portion 23 of the driving member 2 to move the cam portion 21 from the release position to the pushing position. The elastic portion 24 extends from the pivoted portion 22, and abuts against an inner surface of the casing for moving the cam portion 21 from the pushing position to the release position when the driving member 2 is released.

Referring to FIGS. 5 and 6 again, the infant care device 100 further includes an indicating member 5 and a second resilient member 6. The casing 4 is further formed with a window 45. The indicating member 5 has a rod portion 51, a detecting portion 52 and an indication portion 53. The indication portion 53 has a green-colored first indicating region 53a and a red-colored second indicating region 53b. The indicating member 5 is connected pivotally to the casing 4 via the rod portion 51, and is pivotable relative to the casing 4 between a detached position where the second indicating region 53b is registered with and visible through the window 45, and a mounted position where the first indicating region 53a is registered with and visible through the window 45. The second resilient member 6 is connected between the casing 4 and the indicating member 5. In this embodiment, the second resilient member 6 is configured as a torsion spring and is sleeved on the rod portion 51. When the insertion portion 201 is removed from the insertion space 41, the second resilient member 6 biases resiliently the indicating member 5 to the detached position, so that the red-colored second indicating region 53b is visible to alert a user. When the insertion portion 201 is completely inserted into the insertion space 41, the insertion portion 201 pushes the detecting portion 52 to move the indicating member 5 to the mounted position, so that the green-colored first indicating region 53a is visible to indicate that the infant care device 100 is mounted steadily on the stroller 200.

When the infant care device 100 is mounted on the stroller 200, the elastic portion 24 of the driving member 2 is in a released state and the cam portion 21 is at the release position. At this time, the first resilient member 3 biases the latch member 1 to engage the insertion portion 201 of the stroller 200, and the insertion portion 201 pushes the detecting portion 52 of the indicating member 5 to move the indicating member 5 to the mounted position against the biasing action of the second resilient member 6, so that the green-colored first indicating region 53a is visible through the window 45.

To detach the infant care device 100 from the stroller 200, the operating member 7 is pressed to rotate the driving member 2, so that the elastic portion 24 is deformed to generate a restoring force, and the cam portion 21 is moved to the pushing position. At this time, the latch member 1 is moved to the unlocking position against the biasing action of the first resilient member 3 to disengage the engaging portion 11 from the annular recess 201a, so that the insertion portion 201 is removable from the insertion space 41. After removal of the insertion portion 201 from the insertion space 41, the cam portion 21 is restored to the release position by the elastic portion 24, and the latch member is biased by the first resilient member 3 to the locking position.

To mount the infant care device 100 on the stroller 200, the insertion portion 201 only needs to be aligned with the bottom opening 43 of the insertion space 41 and inserted into the insertion space 41. During the insertion, the insertion portion 201 first pushes the inclined end surface 11a to move the latch member 1 against the biasing action of the first resilient member 3, and then engages that latch member 1 through the biasing action of the first resilient member 3.

To sum up, the infant care device 100 of this disclosure has a simple structure and can be operated easily. A user only needs to press the operating member 7 to enable the infant care device 100 to be detached from the stroller 200, and to insert the insertion portion 201 into the insertion space 41 to mount steadily the infant care device 100 on the stroller 200.

Figure 9:
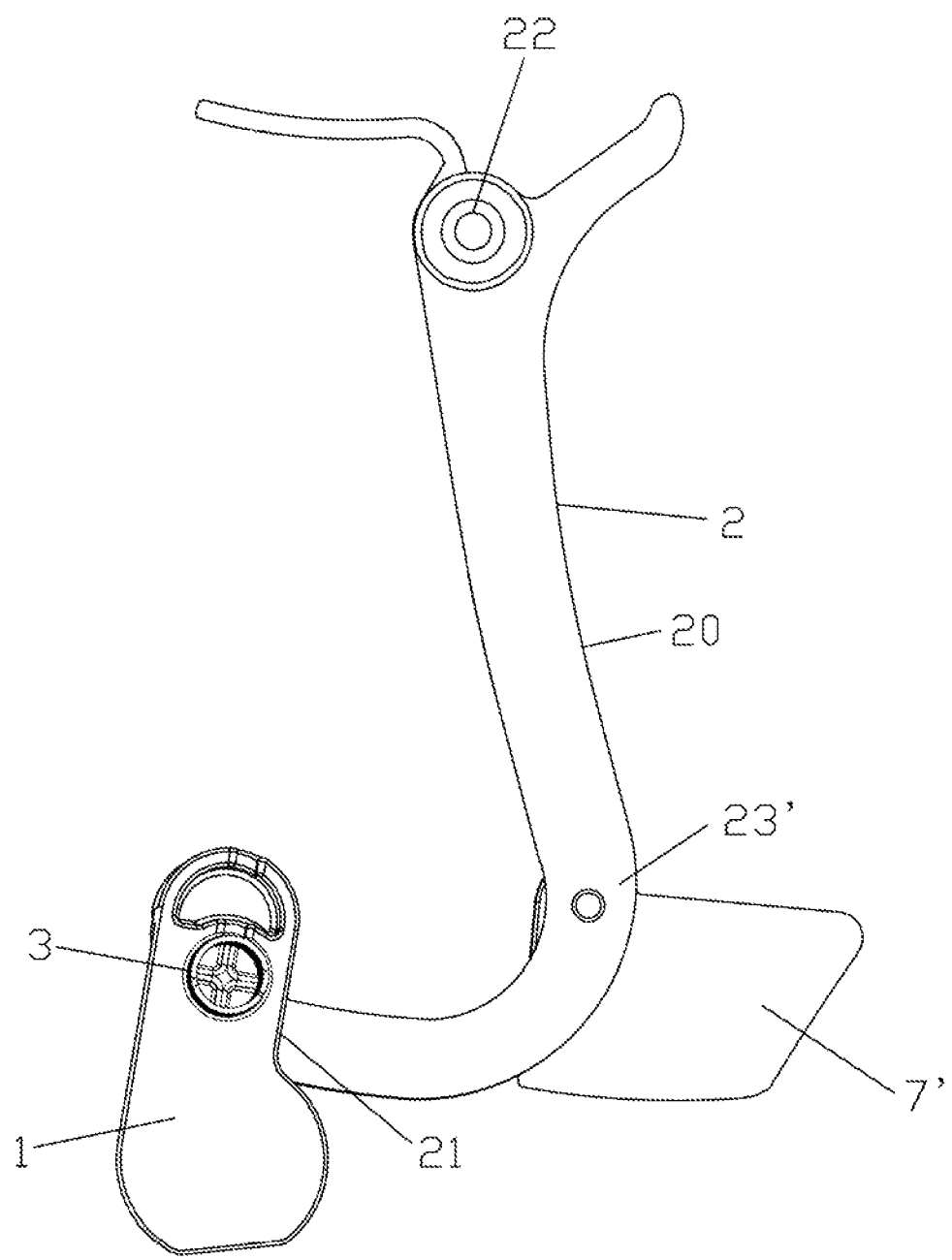
FIG. 9 is a side view of a second embodiment of the infant care device according to the disclosure, in which a casing is omitted.

Referring to FIG. 9, a second embodiment of the infant care device 100 according to the present disclosure is similar to the first embodiment. The driven portion 23' of the driving member 2 of the second embodiment is provided on the L-shaped main body 20, and is located between the pivoted portion 22 and the cam portion 21. The operating member 7' is connected pivotally to the driven portion 23', and also can be pressed to move the cam portion 21 to the pushing position, so as to move the latch member 1 to the unlocking position against the biasing action of the first resilient member 3.

While the present disclosure has been described in connection with what are considered the most practical embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An infant care device adapted to be mounted detachably to a mounting seat, the mounting seat having an insertion portion, said infant care device comprising:
   a casing having an insertion space that has an opening adapted to permit the insertion portion to be inserted removably into said insertion space therethrough;
   a latch member mounted to said casing, and movable relative to said casing in a lateral direction of said infant care device between a locking position where said latch member engages the insertion portion to confine the insertion portion in said insertion space, and an unlocking position where said latch member is disengaged from the insertion portion such that the insertion portion is removable from said insertion space;
   a driving member mounted movably to said casing and having a cam portion, said driving member being able to be pushed to move said cam portion from a release position to a pushing position in a front-rear direction of said infant care device for driving movement of said latch member relative to said casing;
   a first resilient member connected between said casing and said latch member and biasing resiliently said latch member toward the locking position, so as to prevent relative movement between said infant care device and the mounting seat;
   an indicating member mounted pivotally in said casing and having a first indicating region and a second indicating region, said indicating member being pivotable relative to said casing between a detached position where said second indicating region is registered with and visible through a window formed in said casing, and a mounted position where said first indicating region is registered with and visible through said window, said indicating member being pushed by the insertion portion to move to the mounted position when the insertion portion is inserted into said insertion space; and
   a second resilient member connected between said casing and said indicating member for biasing resiliently said indicating member to the detached position when the insertion portion is removed from said insertion space,
   wherein, when said driving member is pushed to move said cam portion to the pushing position, said latch member is pushed by said cam portion to move to the unlocking position against the biasing action of said first resilient member to disengage said latch member from the insertion portion, so as to permit the relative movement between said infant care device and the mounting seat.

2. The infant care device as claimed in claim 1, wherein said first resilient member is connected to one side of said latch member opposite to said cam portion of said driving member.

3. The infant care device as claimed in claim 1, wherein said driving member is connected pivotally to said casing.

4. The infant care device as claimed in claim 1, further comprising an operating member mounted movably to said casing and coupled to a driven portion of said driving member, said operating member being partially disposed outwardly of said casing, and operable to push said driven portion of said driving member to move said cam portion from the release position to the pushing position.

5. The infant care device as claimed in claim 4, wherein said driving member is connected pivotally to said casing, said driven portion being located between said cam portion and a pivoted portion of said driving member that is connected pivotally to said casing.

6. The infant care device as claimed in claim 4, wherein said driving member is connected pivotally to said casing, a pivoted portion of said driving member that is connected pivotally to said casing being located between said cam portion and said driven portion.

7. The infant care device as claimed in claim 1, wherein said driving member further has an elastic portion abutting against an inner surface of said casing for moving said cam portion from the pushing position to the release position when said driving member is released.

\* \* \* \* \*